(12) United States Patent
Herman (10) Patent No.: US 6,773,106 B2
(45) Date of Patent: Aug. 10, 2004

(54) HIGHLY COMPACT MOLDED EYEGLASSES HAVING AN ADJUSTABLE BRIDGE MEMBER PROVIDING POSITIONAL MEMORY

(76) Inventor: Pat Herman, 6120 Abbey Rd., Aptos, CA (US) 95003

(*) Notice: Subject to any disclaimer, the term of this patent is extended or adjusted under 35 U.S.C. 154(b) by 0 days.

(21) Appl. No.: 10/123,333

(22) Filed: Apr. 15, 2002

(65) Prior Publication Data

US 2002/0191150 A1 Dec. 19, 2002

Related U.S. Application Data

(63) Continuation-in-part of application No. 09/603,465, filed on Jun. 22, 2000, now Pat. No. 6,371,614.

(51) Int. Cl.[7] .................................................. G02G 1/00
(52) U.S. Cl. .......................... 351/68; 351/124; 351/126
(58) Field of Search ................................ 351/126, 124, 351/41, 65, 67, 68, 128

(56) References Cited

U.S. PATENT DOCUMENTS

| | | | |
|---|---|---|---|
| 233,681 A | * 10/1880 | Landsberg | 351/68 |
| 1,020,585 A | * 3/1912 | Walter | 351/65 |
| 6,371,614 B1 | * 4/2002 | Herman | 351/126 |

* cited by examiner

Primary Examiner—Hung Xuan Dang

(57) ABSTRACT

Highly compact molded eyeglasses include a first lens portion and a second lens portion coupled via a bridge member. Each lens portion may be characterized by a reference surface and an adjustment surface. From one pair of eyeglasses to another, the reference surface exhibits a constant curvature. The curvature of an adjustment surface is designed relative to that of a reference surface to provide a lens portion having a particular dioptic power. The transition section may include a corrugation and/or a lip to secure the glasses to a wearer's nose. The bridge member acts as a flat spring coupling the lens portions. The bridge member includes an indentation segment joined by bends or curves to a first and a second arm segment. The bridge member's structure provides positional memory properties. The bridge member and the lens portions may be made from polycarbonate in an injection molding process.

8 Claims, 7 Drawing Sheets

Section View at the W Axis

Figures 4A-4C

Material: 302 Spring Tempered, Full Hard, Stainless Steel wire, 0.018" Diam.

| | Radius | X | Y |
|---|---|---|---|
| RR1 | 0.585 | -1.077 | 0.0 |
| RR2 | 0.531 | -1.131 | -0.004 |
| RR3 | 0.200 | -0.417 | 0.378 |
| RR4 | 0.250 | -0.442 | 0.020 |

| | Radius | X | Y |
|---|---|---|---|
| R1 | 0.585 | 1.077 | 0.0 |
| R2 | 0.531 | 1.131 | -0.004 |
| R3 | 0.200 | 0.417 | 0.378 |
| R4 | 0.250 | 0.442 | 0.020 |
| R6 | 0.413 | 0.0 | 0.423 |
| R7 | 0.430 | 0.0 | 0.425 |

| L1 | Angle: | 4.00 |
|---|---|---|
| LL2 | Angle: | 206.10 |
| LL3 | Angle: | 184.00 |

| L2 | Angle: | 333.90 |
|---|---|---|
| L3 | Angle: | 356.00 |

Figure 6

Lenses and bridge molded as one part

HIGHLY COMPACT MOLDED EYEGLASSES HAVING AN ADJUSTABLE BRIDGE MEMBER PROVIDING POSITIONAL MEMORY

CROSS REFERENCE TO RELATED APPLICATION

This application is a continuation-in-part of U.S. application Ser. No. 09/603,465, filed on Jun. 22, 2000, now U.S. Pat. No. 6,371,614, which is incorporated herein by reference.

BACKGROUND OF THE INVENTION

Highly-compact eyewear can provide great convenience, and may additionally prove useful in critical situations when conventional eyewear has been lost, misplaced, or forgotten. Compact eyeglasses should meet several requirements. In particular, compact eyeglasses should be very small in size, such that the eyeglasses are as small as possible while still providing good optical performance. Compact eyeglasses should also have thin lenses, even when the lenses provide a high level of magnification. Additionally, compact eyeglasses should provide a wearer with a secure, yet comfortable fit, and should be easily adjustable to accommodate variations in facial structure. Also, compact eyeglasses should provide a high level of durability and damage resistance. Compact eyeglasses should further be manufacturable via simple, robust techniques. Finally, compact eyeglasses should be inexpensive. Unfortunately, prior compact eyeglasses fail to adequately meet the aforementioned requirements.

SUMMARY OF THE INVENTION

The present invention provides highly-compact eyeglasses that readily meet the aforementioned needs. The present invention comprises a first lens portion and a second lens portion that are coupled via a bridge member. The lens portions and the bridge member may be formed or molded from a single piece of polycarbonate or similar material, for example, through an injection molding process. The lens portions may be right- and left-side versions of each other. Each lens portion may include an optical section that provides desired refractive, magnifying, and/or light-focusing characteristics; and a transition section that may serve as an interface between the optical section and the bridge member, and which may further provide a gripping region that ensures a secure fit against or upon a wearer's nose. The optical and transition sections may be comprised of a single, contiguous piece of material such as polycarbonate, which may facilitate ease of manufacturability.

The optical section may include a reference surface characterized by a reference curvature; and an adjustment surface characterized by a curvature that is designed or selected relative to the reference curvature to provide the optical section with a desired dioptic power.

The transition section may include an upper surface, a lower surface, and an edge. In one embodiment, the distance between the transition section's lower surface and a peak or top of the optical section's reference surface is independent or essentially independent (relative to manufacturing process variation, for example) of the lens portion's optical characteristics.

The transition section's upper surface may include a lip or rim that can aid in securing a lens portion to a wearer's nose in a comfortable manner. Additionally, the transition section's edge may include a corrugated or roughened section or segment, which can further aid in comfortably securing the present invention to a wearer's nose. The lip and/or the corrugated section may eliminate the need for nose pads found on other types of eyewear, thus enhancing the compactness and durability of the present invention.

The bridge member may serve as a type of flat spring that couples the first and second lens portions. The bridge member may provide or exhibit a memory relative to positional displacement. The bridge member may be readily spread and/or contracted, facilitating adjustment of the distance between the first and second lens portions, and helping to support the eyeglasses upon a wearer's nose. In one embodiment, the bridge member comprises a generally m-shaped piece of thin material having a circular, elliptical, or oblong cross section, and which includes a first arm segment, a second arm segment, and an indentation segment.

The indentation segment may join the first and second arm segments, and may comprise an indented region along the bridge member's length. In one embodiment, the indentation segment comprises a generally u-shaped indentation located approximately midway between the first and second arm segments. The presence of the indentation segment and/or the manner in which it couples or interfaces to the first and second arm segments may advantageously enable the bridge member to function as a flat spring having positional memory characteristics, thereby facilitating a very high degree of adjustability relative to a wide range of facial types. The bridge member may further enhance the eyeglasses' lateral stability.

DETAILED DESCRIPTION

Figure 1:
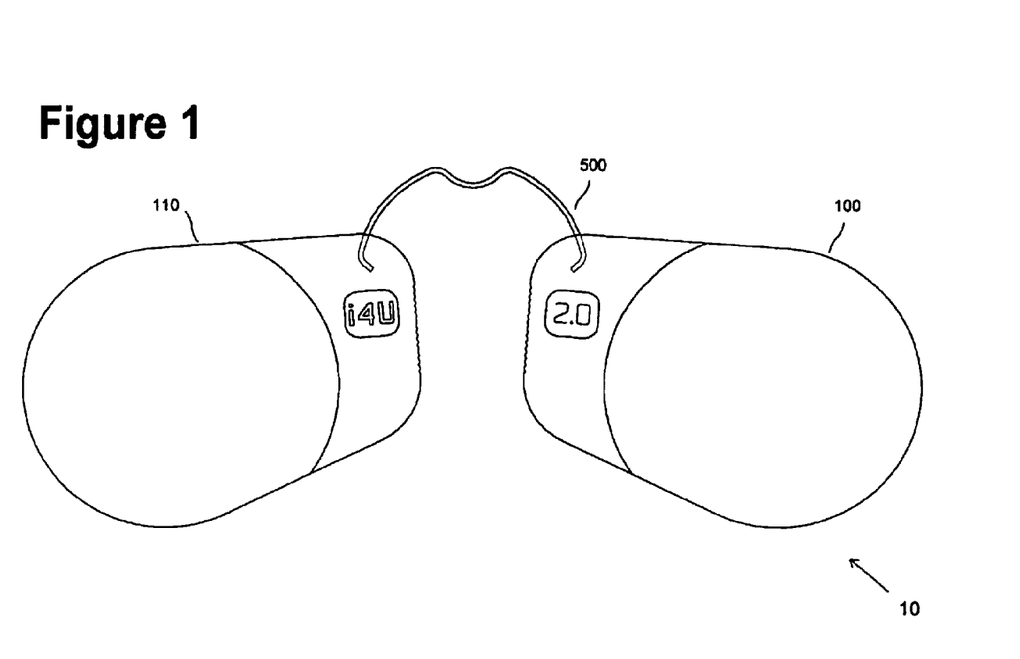
FIG. 1 is a frontal view of a pair of highly-compact eyeglasses constructed in accordance with the present invention.

FIG. 1 is a frontal view of a pair of highly-compact eyeglasses 10 constructed in accordance with the present invention. The eyeglasses 10 comprise a first 100 and a second 110 lens portion that are coupled via a bridge member or wire 500. The eyeglasses 10 are characterized by thin lens portions 100, 110; ease of adjustability; secure fit; durability; ease of manufacturability; and low cost. Eyeglasses 10 of the type described herein may be stored inside a wallet, or essentially any small carrier suitable for transporting an object having a length, a width, and/or a thickness approaching or approximating that of a typical credit card.

In the description that follows, various portions or elements of the present invention may be described and/or depicted as having particular dimensions and/or characteristics. Those skilled in the art will recognize that such dimensions and/or characteristics may be exemplary and/or particular to specific embodiments, and that a wide range of embodiments having various dimensions and/or characteristics may be possible.

A. Lens Portions

In one embodiment, the first and second lens portions 100, 10 are right- and left-side versions of each other. Hence, those skilled in the art will readily understand that design, manufacturing, and/or performance considerations associated with the first lens portion 100 may also be applicable to the second lens portion 110.

Figure 2:
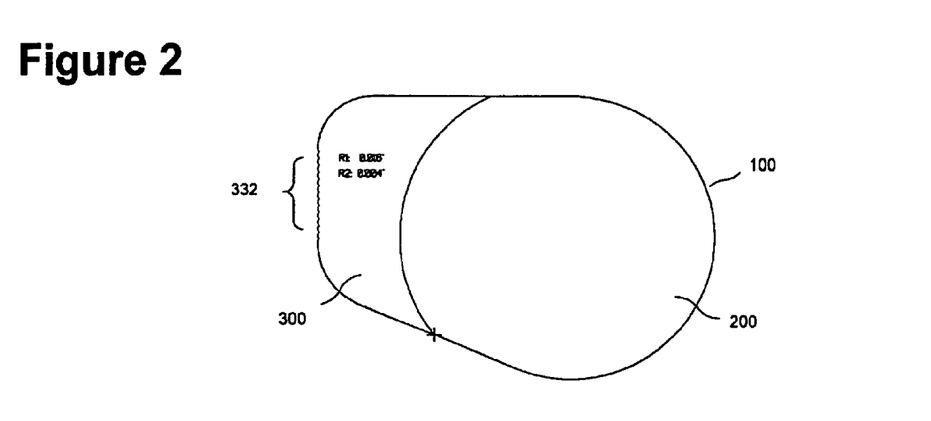
FIG. 2 is a frontal view of a first lens portion.

FIG. 2 is a frontal view of a first lens portion 100 constructed in accordance with the present invention. In one embodiment, the first lens portion 100 comprises a single piece of material having an optical section or region 200 and a transition section or region 300. The optical section 200 provides the first lens portion 100 with desired refractive, magnifying, and/or light-focusing characteristics or capabilities. The transition section 300 serves as an interface between the optical section 200 and the bridge member 500, and also provides the first lens portion 100 with enhanced gripping abilities to ensure a secure fit against a wearer's nose. Each element comprising the first lens portion 100 is described in greater detail hereafter.

Figure 3:
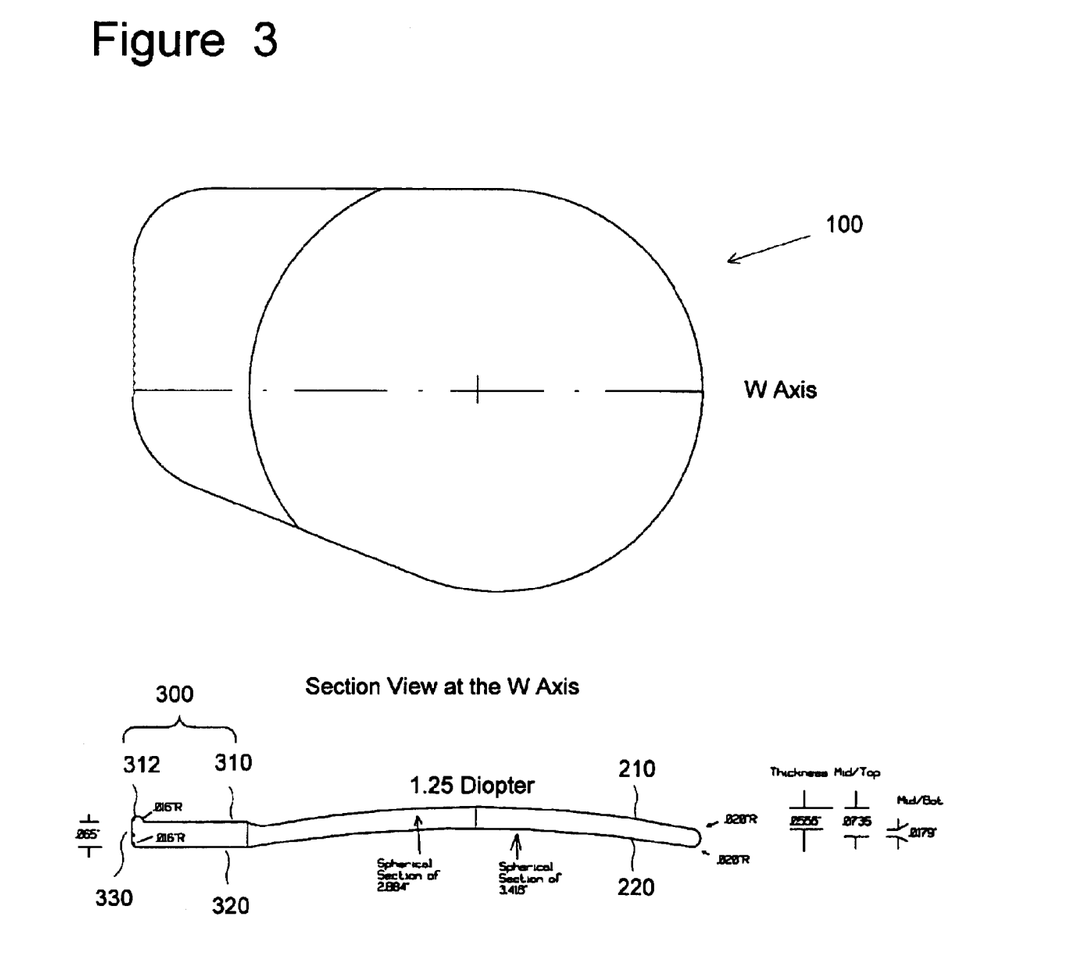
FIG. 3 is a cross-sectional view of an exemplary first lens portion.

FIG. 3 is a cross-sectional view of an exemplary first lens portion 100 constructed in accordance with the present invention, which provides a dioptic power of 1.25. In the embodiment shown in FIG. 3, the optical section 200 comprises a single piece of material characterized by a reference surface 210 and an adjustment surface 220. The reference surface 210 comprises a cross-section of a first sphere having a reference curvature. The reference surface's curvature may remain the same regardless of the optical section's refractive characteristics. The adjustment surface 220 comprises a cross-section of a second sphere, where the curvature of the second sphere is designed or selected in accordance with providing the optical section 200 with desired refractive characteristics. As the curvature of the adjustment surface 220 varies to provide target refractive characteristics, the thickness of the optical section 200 correspondingly changes.

In the exemplary embodiment shown in FIG. 3, the curvature of the reference surface 210 corresponds to a spherical section associated with a spherical radius of 2.884 inches, or a dioptic power of 8.00, using conventional polycarbonate material. To provide an optical section 200 characterized by an overall dioptic power of 1.25, the adjustment surface 220 corresponds to a spherical section associated with a spherical radius of 3.418 inches, or 6.75 diopters. Those skilled in the art will understand that the aforementioned radii, or, equivalently, dioptic powers, may vary in accordance with a given dioptic power desired. Thus, for example, the curvature of the adjustment surface 220 may be varied or chosen relative to that of the reference surface 210 to provide an overall dioptic power of 1.50, 1.75, 2.00, 2.25, or 2.50 diopters. Those skilled in the art will further understand that the aforementioned radii or dioptic powers may also differ in accordance with the type of material from which the lens portion 100, 110 is constructed. Those skilled in the art will additionally recognize that standard optical techniques or calculations may be used to determine the spherical section dimensions required to achieve essentially any target dioptic power for a given material from which the lens portion 100, 110 is manufactured.

The transition section 300 may serve as an interface between the optical section 200 and the bridge member 500, and may ensure that the first lens portion 100 fits snugly against a wearer's nose. In one embodiment, the transition section 300 comprises a single piece of material that is contiguous with the optical section 200. In other words, the transition section 300 and the optical section 200 may be formed from or in a single piece of material, such as a conventional polycarbonate material. This in turn may greatly simplify the manufacturing process and advantageously reduce cost. Those skilled in the art will recognize that in alternate embodiments, a lens portion 100, 110 could comprise another type of material, and/or the optical section 200 and the transition sections 300 may comprise different materials.

In one embodiment, the transition section 300 includes an upper surface 310, a lower surface 320, and an edge 330. Regardless of the optical characteristics of the lens portion 100, the thickness of the lens portion 100 as measured from the lower surface 320 of the transition section 300 to the top or peak of the reference surface 210 may remain constant, as indicated in FIG. 3. Thus, the thickness of the lens portions 100, 110, as measured from a transition region's lower surface 320 to the peak of a reference surface 210, may be independent of the lens portion's refractive or magnifying properties.

The upper surface 310 may include a lip or rim 312, which aids in providing a secure grip between the first lens portion 100 and a wearer's nose. Placement of the lip 312 on the upper surface 310 may be more effective than having the lip 312 reside upon the lower surface 320. Referring also now to FIG. 2, the transition section's edge 330 may include a roughened segment or corrugation 332 along at least a portion of its length. The corrugation 332 increases the lens portion's contact area against a wearer's nose, and hence increases friction to further facilitate non-slip, yet comfortable, contact. The lip 312 and the corrugation 332 may advantageously eliminate the need for nose pads found on other types of eyewear, thereby enhancing the compactness and durability of the present invention.

In an exemplary embodiment, the first and second lens portions 100, 110 are comprised of conventional polycarbonate material, and are fabricated using conventional injection molding techniques.

B) Bridge Member

Figure 4A:
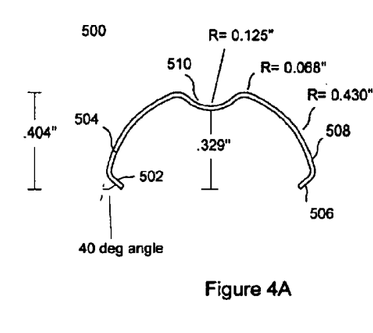
FIGS. 4A, 4B, and 4C are frontal views of exemplary bridge members according to various embodiments of the invention.
Figure 4B:
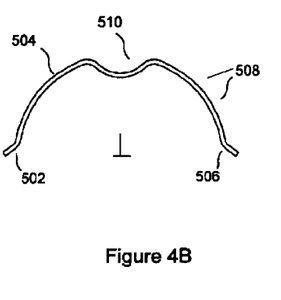
Figure 4C:
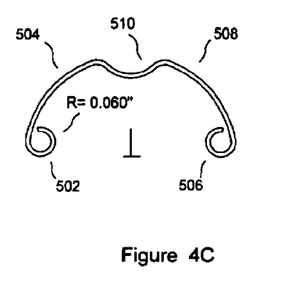

The bridge member 500 facilitates adjustment of the distance between the first and second lens portions 100, 110, and helps support the eyeglasses 10 upon a wearer's nose. FIGS. 4A, 4B, and 4C are frontal views of exemplary bridge members 500 constructed in accordance with the present invention. In one embodiment, the bridge member 500 comprises a portion, section, or segment of a thin wire having a generally circular or elliptical cross-section, and which includes a first end segment 502, a first arm segment 504, a second end segment 506, a second arm segment 508, and an indentation segment 510. Additionally, the bridge member 500 may be a single piece of wire that is somewhat or generally m-shaped. In another embodiment described in detail below with reference to FIG. 6, the bridge member 500 comprises a piece of polycarbonate or similar material. Those skilled in the art will recognize that various bridge member shapes and/or material compositions may be possible in alternate embodiments.

The bridge member 500 essentially functions as an adjustable flat spring that couples, joins, or interconnects the first and second lens portions 100, 110. As the bridge member 500 exhibits spring-like characteristics, it retains a memory relative to displacement about or around to a default position. The indentation segment 510 positioned between the first and second arm segments 504, 508 and the manner in which it is coupled or joined thereto may be particularly important with respect to providing the bridge member 500 with positional memory characteristics. The first and second arm segments 504, 508 may have and/or be characterized by a first radius of curvature, while the indentation segment 510 may have and/or be characterized by a second radius of curvature. The indentation segment 510 may be coupled or joined to the arm segments 504, 508 through a set of curved regions or bends or corners, as further detailed below.

When the eyeglasses 10 reside upon a wearer's nose, the distance between the bridge member's first and second arm segments 504, 508 and/or the distance between the bridge member's first and second end segments 502, 506 typically increases relative to that in the default position. Removal of the eyeglasses 10 may cause the bridge member 500 to essentially return to its default position. A predetermined or as-manufactured default position may be selected to accommodate a wide variety of facial types; alternatively, a wearer may adjust the eyeglasses 10 such that the bridge member 500 exhibits a new and/or different default position. Hence, the default position may be adjusted or changed via bending or moving the bridge member 500 past a certain point, allowing a wearer to easily adjust the eyeglasses 10 to further customize fit, if necessary. The spring-like behavior of the bridge member 500 may also serve to enhance the eyeglasses' damage resistance.

In one embodiment, the first and second end segments 502, 506 comprise terminal portions of the bridge member 500 that are bent, curved, and/or looped relative to the first and second arm segments 504, 508, respectively. The eyeglasses 10 of the present invention may be manufactured via an injection molding process. Thus, the first and second end segments 502, 506, as well as portions of the first and second arm segments 504, 508, may be embedded or encapsulated within the first and second lens portions 100, 110 during manufacture. It may be important to ensure that the positions of the first and second end segments 502, 506 remain essentially constant throughout the manufacturing process, and hence from one pair of eyeglasses 10 to another. This may be facilitated through a) the use of bent, curved, and/or curled end segments 502, 506, rather than a bridge member 500 having completely or essentially straight ends; and/or b) keeping the distance between a given end segment 502, 506 and the edge 330 or boundary of a lens portion's transition region 300 small. The first and second end segments 502, 506 may further enhance the eyeglasses' lateral strength, thereby increasing durability.

Those skilled in the art will recognize that depending upon embodiment, one or more sections of the bridge member 500 may not be embedded within the lens portions 100, 110 during manufacture. In such embodiments, an end segment 502, 506 may attach to the surface of a lens portion 100, 110, where the lens portion 100, 110 may include a receiving member or similar structure to facilitate such attachment. In an embodiment described below with reference to FIG. 6, the bridge member 500 and the lens portions 100, 110 may be molded using a polycarbonate or similar material, possibly as a single unit or piece.

The indentation segment 510 comprises a recessed or indented region or section of the bridge member 500 located approximately or essentially midway between the first and second arm segments 504, 508 and/or the first and second end segments 502, 506. The indentation segment 510 and the manner in which it couples, joins, and/or connects the first and second arm segments 504, 508 may advantageously provide the bridge member 500 with positional memory characteristics to facilitate easy adjustability over a wide range of positions. In particular, the point and/or region at which the indentation segment 510 couples or joins to an arm segment 504, 508 may form a curved region, bend, or corner having a smaller radius of curvature than the arm segment 504, 508 or the indentation segment 510. When the bridge member's arm segments are spread or contracted significantly or sharply (i.e., with significantly greater force than necessary to spread the arm segments 504, 508 while putting the eyeglasses on), a spreading or contracting force upon the bridge member 500 may be directed into the curved regions, bends, or corners where the indentation segment 510 joins the first and second arm segments 504, 508. As a result, the angle of these corner regions may either increase or decrease accordingly, thereby changing the bridge member's geometry and establishing a new default position. Such a change in bridge member geometry may be remain until the eyeglasses 10 are adjusted for a different wearer's nose in an analogous manner. A bridge member 500 designed in accordance with the present invention may therefore facilitate repeatable and comfortable adjustment across a wide variety of facial characteristics.

In various embodiments, the indentation segment 510 may further ensure ease of manufacturability by providing a secure holding point or region during a manufacturing process. This can be quite important when a high-pressure injection molding process is employed, in which case the indentation segment 510 may serve as a mechanism by which a bridge member 500 implemented as a wire may be securely held or positioned in a manufacturing mold. The indentation segment 510 additionally enhances the lateral stability of the bridge member 500, aiding in securing the eyeglasses 10 to a wearer's nose. In one embodiment, the indentation segment 510 is generally unshaped. Those skilled in the art will recognize that the indentation segment 510 may have a w or other type of shape in an alternate embodiment.

The bridge members 500 shown in FIGS. 4A through 4C can readily accommodate a wide variety of variation in facial characteristics. Those skilled in the art will understand that bridge members 500 having different curvatures and/or dimensions may be employed to accommodate essentially any type of facial features. In an exemplary embodiment, the bridge member 500 is comprised of type 302 spring-tempered, full-hardness stainless steel wire, having a diameter of approximately 18 mils. Furthermore, the first and second end segments 502, 506 may be bent at angles of +40 and −40 degrees, respectively, relative to the first and second arm segments 504, 508. The first and second end segments 502, 506 may be approximately 0.070 inches long, and the entire length of the bridge member 500 may be approximately 1.35 inches. Additionally, the distance between a given end segment 502, 506 and a lens portion's edge 330 may be between approximately 0.125 and 0.150 inches. In alternate embodiments, the first and/or second end segments 502, 506 may be dimensioned differently and/or bent, curled, and/or looped differently from and/or opposite to the directions shown in FIGS. 4A through 4C.

C) Additional Features and Exemplary Eyeglass Dimensions

Figure 5:
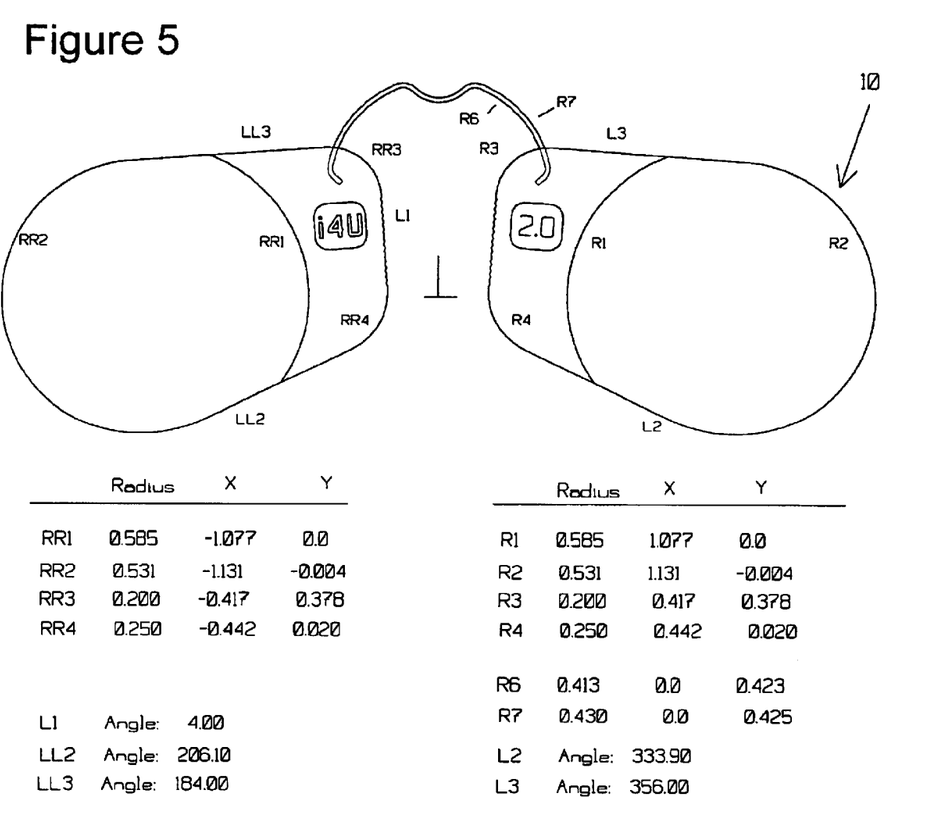
FIG. 5 is a schematic diagram showing dimensions for an exemplary pair of highly compact eyeglasses.

FIG. 5 is a schematic diagram showing dimensions for an exemplary pair of highly compact eyeglasses 10 constructed in accordance with the present invention. An important design parameter may be the angle between the edge 330 of a lens portion's transition region and a vertical axis that bisects the bridge member 500. The extent of this angle influences the fit of the eyeglasses 10 against a wearer's nose, and is chosen to accommodate a wide range of variation for one or more facial types. In one embodiment, this angle equals 4.00 degrees. Those skilled in the art will recognize that multiple versions of the eyeglasses 10 could be designed and manufactured with angles and/or dimensions chosen to best accommodate a particular set of facial types.

D) Fully Molded Embodiments

Figure 6:
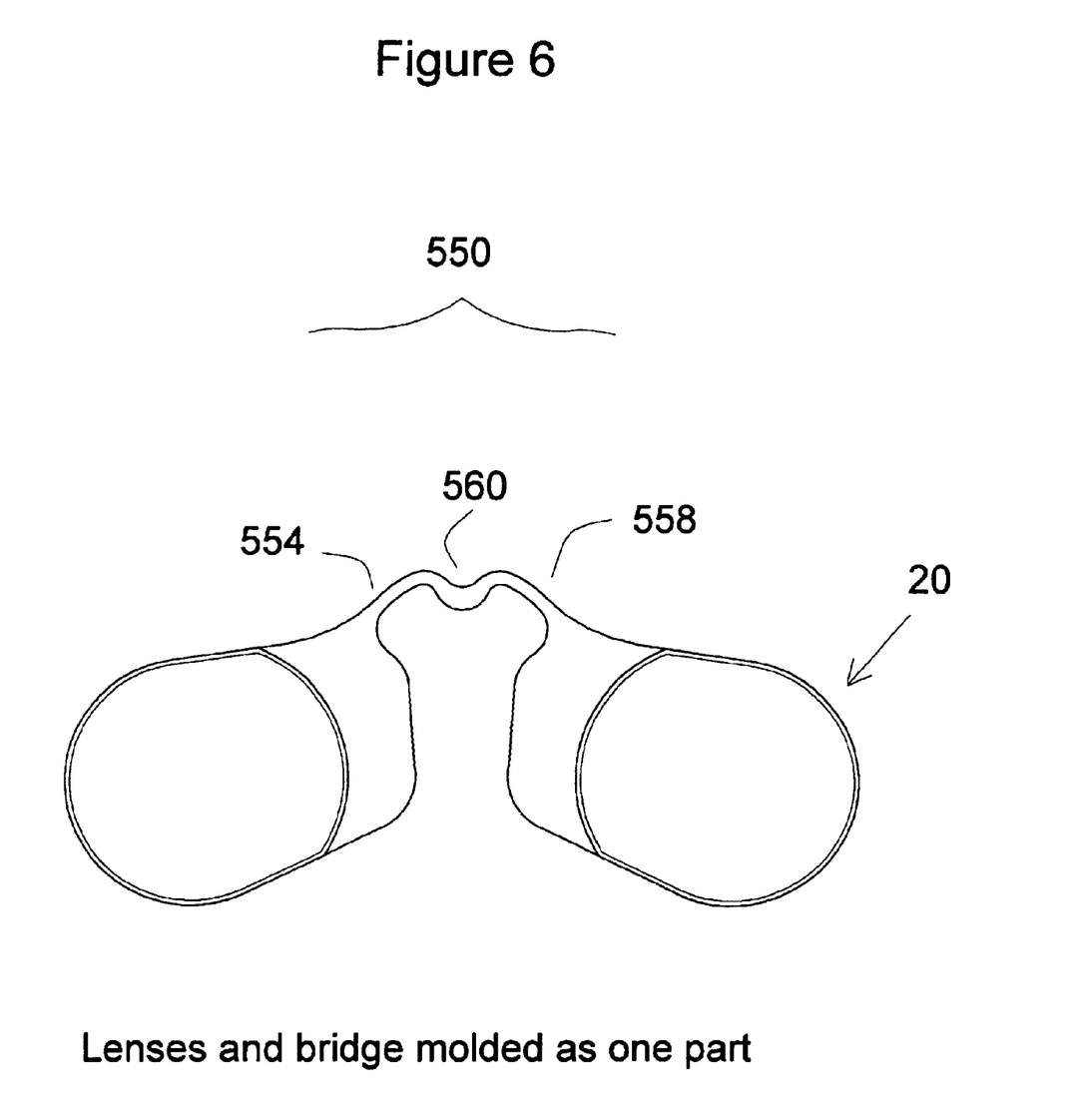
FIG. 6 is a frontal view of a pair of molded eyeglasses having a molded bridge member providing positional memory according to an embodiment of the invention.

FIG. 6 is a schematic diagram showing a pair of highly-compact molded eyeglasses 20 having a molded bridge member 550 providing positional memory according to an embodiment of the invention. The molded bridge member 550 may include a first arm segment or section 554, a second arm segment or section 558, and an indentation region 560. Because the bridge member 550 itself is molded, the eyeglasses 20 may be formed as a single molded unit or piece, for example, through an injection molding process using a polycarbonate material.

The indentation region 560 may be coupled to the first and second arm segments 554, 558 in a manner analogous to that described above, that is, through corner regions, bends, and/or curves. The first and second arm segments 554, 558 have and/or are characterized by a first radius of curvature. The indentation segment 560 may have and/or be characterized by a second radius of curvature, which may be smaller and/or oppositely directed than the first radius of curvature. The corner regions, bends, and/or curves joining the indentation segment 550 with the first and second arm segments 554, 558 may provide or facilitate positional memory behavior in a manner identical or analogous to that described above.

Figure 7:
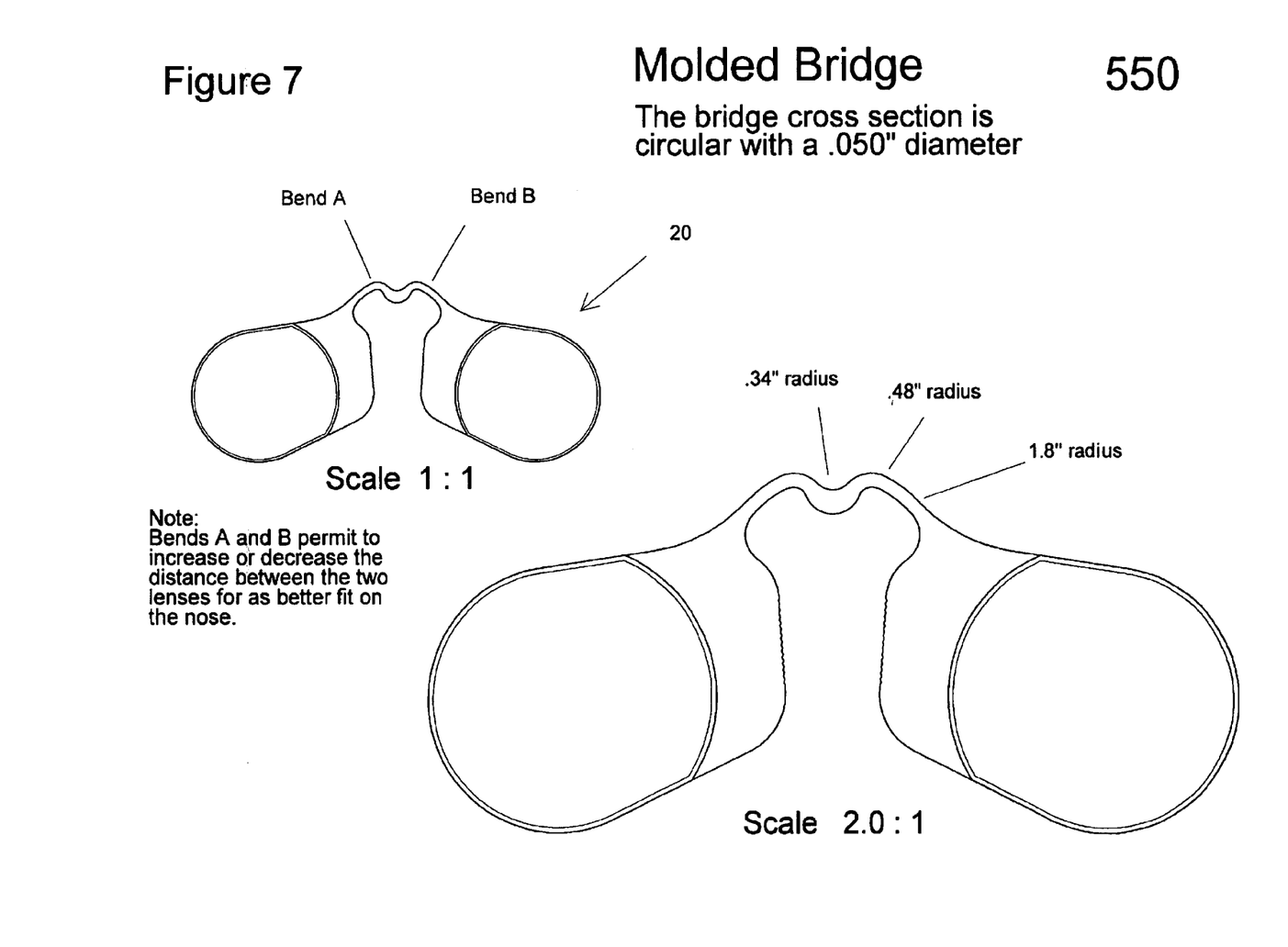
FIG. 7 is a frontal view of an exemplary pair of molded eyeglasses having a molded bridge with a circular cross section, showing corresponding bridge member dimensions.
Figure 8:
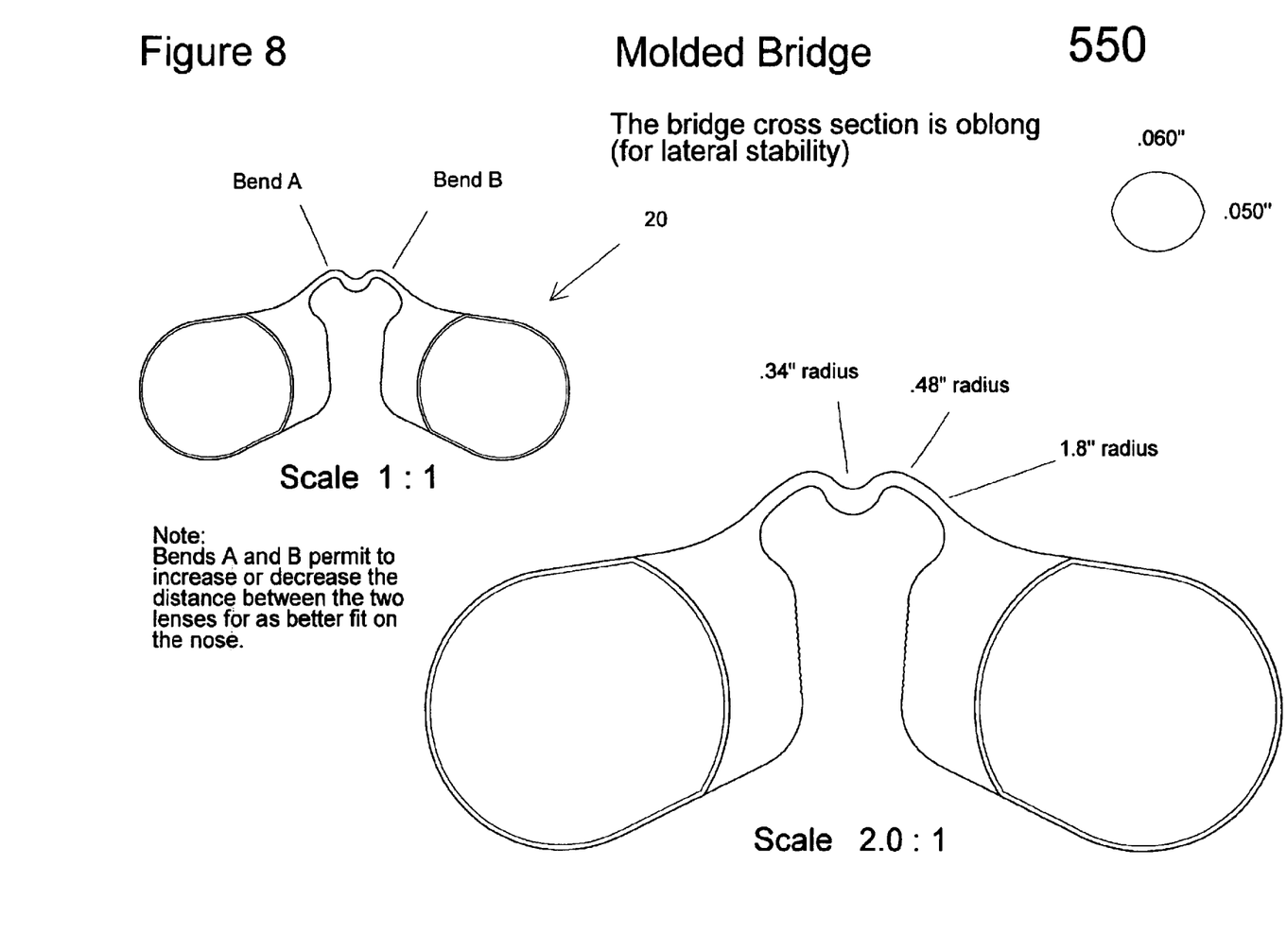
FIG. 8 is a frontal view of an exemplary pair of molded eyeglasses having a molded bridge with an oblong cross section, showing corresponding bridge member dimensions.

The bridge member 550 may have a circular, elliptical, oblong, and/or polygonal cross section. FIG. 7 is a frontal view of an exemplary pair of molded eyeglasses having a molded bridge with a circular cross section, showing corresponding bridge member dimensions. FIG. 8 is a frontal view of an exemplary pair of molded eyeglasses having a molded bridge with an oblong cross section, showing corresponding bridge member dimensions.

While the present invention has been described with reference to particular embodiments, those skilled in the art will understand that various modifications may be provided. For example, the first and second lens portions 100, 110 may not be exact right- and left-side versions of each other. As another example, a lens portion 100, 110 may be essentially entirely comprised of an optical section, having little or no transition section. In such an embodiment, the bridge member 500 may be embedded or formed within the optical section, and the optical section may include a lip and/or corrugation in a manner analogous to that described above for the transition section. As another example, the bridge member 500 may be attached to or formed upon the outside of one or both lens portions 100, 110 rather than embedded within during an injection molding or other type of manufacturing process; or the bridge member 500 could extend further along and/or within a lens portion. As yet another example, the bridge member 500 may not be a single piece of material, but may be comprised of two or more material segments. Additionally, one or more portions of the bridge member 500 may be implemented using materials other than those indicated above. The description herein provides for these variations, as well as others, and is limited only by the following claims.

What is claimed is:

1. Eyeglasses comprising:

a first lens portion;

a second lens portion; and a bridge member coupling the first and second lens portions, the bridge member having a first radius of curvature proximate the first and second lens portions, a second radius of curvature approximately midway between the first and second lens portions, and a third radius of curvature between the first and second radii of curvature, wherein the third radius of curvature is less than the first and second radii of curvature, wherein the bridge member comprises an adjustable positional memory device, and wherein the eyeglasses form a single molded piece of material.

2. The eyeglasses of claim 1, wherein the bridge member comprises a material having one from the group of a circular, an elliptical, and a polygonal cross section.

3. Eyeglasses comprising:

a first lens portion;

a second lens portion; and a bridge member comprising:

a first arm segment having a first radius of curvature;

a second arm segment having a second radius of curvature;

an indentation segment formed between the first and second arm segments, the indentation segment having a second radius of curvature; and a first and a second corner portion, each corner portion having a third radius of curvature, the first and second corner portions respectively joining the first and second arm segments to the indentation segment, wherein the bridge member comprises an adjustable positional memory device, and wherein the eyeglasses form a single molded piece of material.

4. The eyeglasses of claim 3, wherein the third radius of curvature is less than the first and second radii of curvature.

5. An adjustable positional memory device for coupling a first eyeglass lens and a second eyeglass lens, the adjustable positional memory device comprising:

a first arm segment having a first radius of curvature;

a second arm segment having a second radius of curvature;

an indentation segment formed between the first and second arm segments, the indentation segment having a second radius of curvature; and a first and a second corner portion, each corner portion having a third radius of curvature, the first and second corner portions respectively joining the first and second arm segments to the indentation segment, wherein the first and second corner portions are sized such that the adjustable positional memory device forms a generally flat spring having a positional memory about an adjustable default position.

6. The adjustable positional memory device of claim 5, wherein the direction of the second radius of curvature is opposite to that of the first radius of curvature.

7. The adjustable positional memory device of claim 5, wherein the adjustable positional memory device comprises a material having one from the group of a circular, an elliptical, and a polygonal cross section.

8. Eyeglasses comprising:
   a first lens portion;
   a second lens portion; and
   an adjustable positional memory device coupling the first and second lens portions, the adjustable positional memory device having at least two coupled segments, wherein the first lens portion, the second lens portion, and the adjustable positional memory device form a single molded piece of material.

* * * * *